United States Patent [19]

Flaming

[11] Patent Number: 5,570,868

[45] Date of Patent: Nov. 5, 1996

[54] LUBRICATING VALVE FOR A PUMP

[75] Inventor: Lynn A. Flaming, Elsie, Nebr.

[73] Assignee: L & M Manufacturing, Inc., Elsie, Nebr.

[21] Appl. No.: 458,567

[22] Filed: Jun. 2, 1995

[51] Int. Cl.[6] .............................. F16K 31/12; F16N 13/16
[52] U.S. Cl. ................... 251/14; 184/29; 184/65
[58] Field of Search ............................ 251/14; 184/29, 184/65, 66, 72, 74, 75, 76, 79; 137/98, 99

[56] References Cited

U.S. PATENT DOCUMENTS

| | | |
|---|---|---|
| 701,745 | 6/1902 | Lyddon . |
| 982,906 | 1/1911 | Triftshauser . |
| 1,889,802 | 12/1932 | Ferris . |
| 2,136,952 | 11/1938 | Ploen et al. . |
| 2,285,426 | 6/1942 | Freeman .................................. 184/65 X |
| 2,995,213 | 8/1961 | Gross . |
| 3,243,103 | 3/1966 | Bellmer .................................. 184/29 X |
| 3,693,757 | 9/1972 | Callahan et al. ..................... 184/29 X |
| 4,125,176 | 11/1978 | Thrasher, Jr. ........................ 184/29 X |
| 4,397,214 | 8/1983 | Mannhart et al. ................... 184/29 X |
| 4,542,766 | 9/1985 | Gawer et al. ........................ 184/29 X |
| 4,617,992 | 10/1986 | Abel . |
| 4,650,151 | 3/1987 | McIntyre ................................. 251/14 |
| 4,738,600 | 4/1988 | Safford ................................. 184/29 X |
| 4,815,692 | 3/1989 | Loiseau et al. . |

*Primary Examiner*—Kevin Lee
*Attorney, Agent, or Firm*—Greer, Burns & Crain, Ltd.

[57] ABSTRACT

An improved lubricating valve for irrigation systems for automatically lubricating the turbine pump of an irrigation system when the turbine pump is running. The valve is configured to receive a pressure line from the pump and to automatically open when the pressure from the pump reaches a predetermined level indicating the pump is running and in need of lubrication. The valve also contains a manual override for manually opening the valve providing lubrication to the pump when extra lubrication is desirable, such as during preseason.

17 Claims, 4 Drawing Sheets

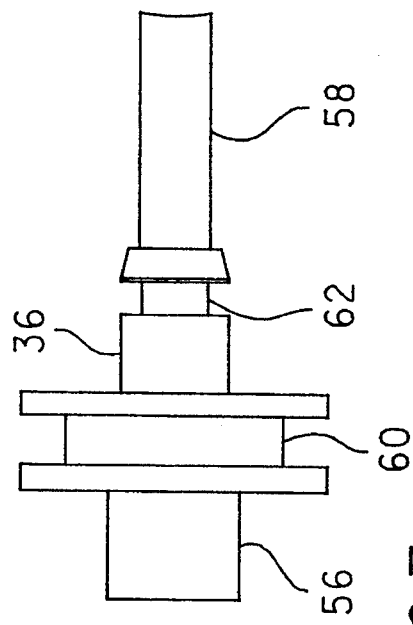
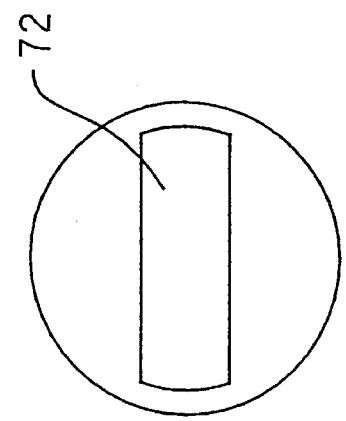
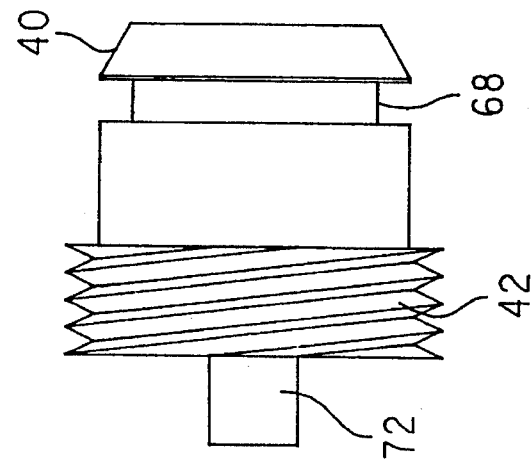

LUBRICATING VALVE FOR A PUMP

BACKGROUND OF THE INVENTION

The present invention relates generally to lubrication valves. More particularly, the present invention relates to automatic drip lubrication valves which can be used with irrigations systems.

Irrigation systems have been developed which automate the irrigation process. These systems generally include turbine pumps for pumping water through the system, and such pumps are generally large and expensive pieces of equipment.

Inadequate lubrication is the leading cause of turbine pump failures. Most turbine pumps are lubricated using a standard one gallon drip tank which is attached to the pump. The standard drip tank continuously drips lubricants, such as oil, into the pump. However, standard drip tanks tend to become contaminated or plugged causing the oiler to quit dripping. Furthermore, standard one gallon drip tanks require supervision so that they do not inadvertently drain until they are empty leaving the pump without a lubrication source. Therefore, there is a need for an automatic drip oiler which requires less supervision and which does not easily become plugged.

Unrestricted lubrication of the pump wastes oil and allows unnecessary contamination of the water supply. Standard drip tanks continuously drip oil into the pump whether or not the pump is running. This can result in overlubrication and waste of oil. Also, irrigation pumps are often located in fields that may not be easily accessible, so it is important that the producer knows when more oil should be put in the tank. This can be determined as a result of the fact that the producer generally knows the running time of the pump and the consumption of oil per hour. Therefore, there is also a need for an automatic drip oiler which lubricates the pump only when the pump is running.

There are occasions, such as preseason, when it is desirable to provide extra lubrication to the pump. Preseason lubrication is vital to the life of the line shaft bearings of the turbine pump. Therefore, there is a need for an automatic drip oiler which contains a manual override for allowing extra manual lubrication on demand.

Accordingly, it is a general object of the present invention to provide an improved lubricating valve for irrigation systems in which lubrication is automatically provided only during periods when the pump is operating.

Another object of the present invention is to provide an improved lubricating valve for irrigation systems which guards against plugging.

Yet another object of the present invention is to provide an improved lubricating valve for irrigation systems that results in requiring less supervision of the oil supply.

It is a further object of the present invention to provide an improved lubricating valve for irrigation systems which guards against overlubrication and contamination of the water supply.

Still a further object of the present invention is to provide an improved lubricating valve for irrigation systems which is configured to minimize wasting of oil.

Yet a further object of the present invention is to provide an improved lubricating valve for irrigation systems with a manual override for overriding automatic operation of the valve for preseason lubrication.

Other objects and advantages of the present improved lubricating valve for irrigation systems will be apparent from the following description taken in conjunction with the accompanying drawings in which:

FIG. 6 is an exploded side view of the first piston shaft;

FIG. 7 is an exploded side view of the cap and second piston head; and

FIG. 8 is an exploded front view of the cap.

SUMMARY OF THE INVENTION

Figure 1:
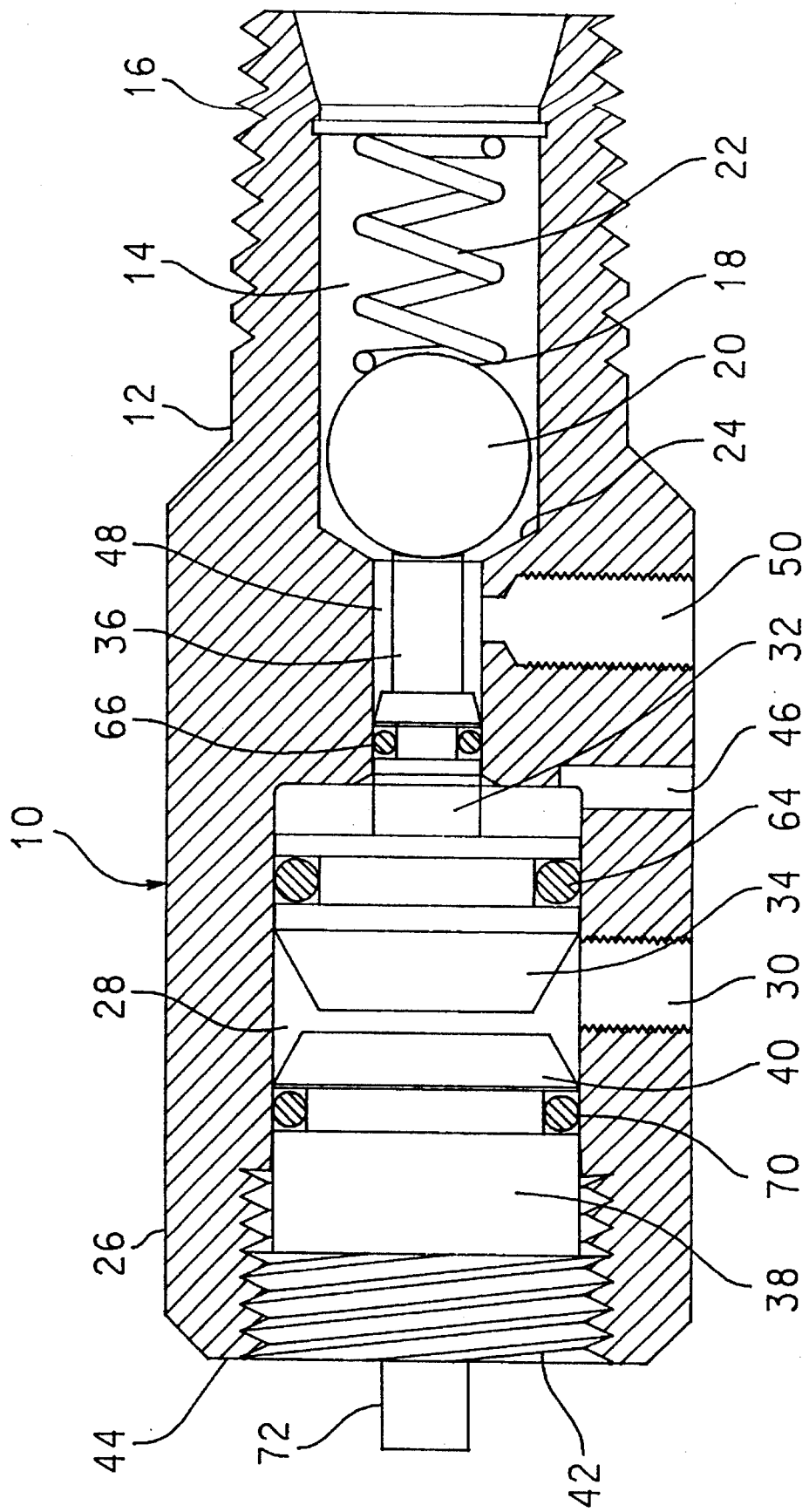
FIG. 1 is a side sectional view of the improved lubrication valve for irrigation systems.
Figure 3:
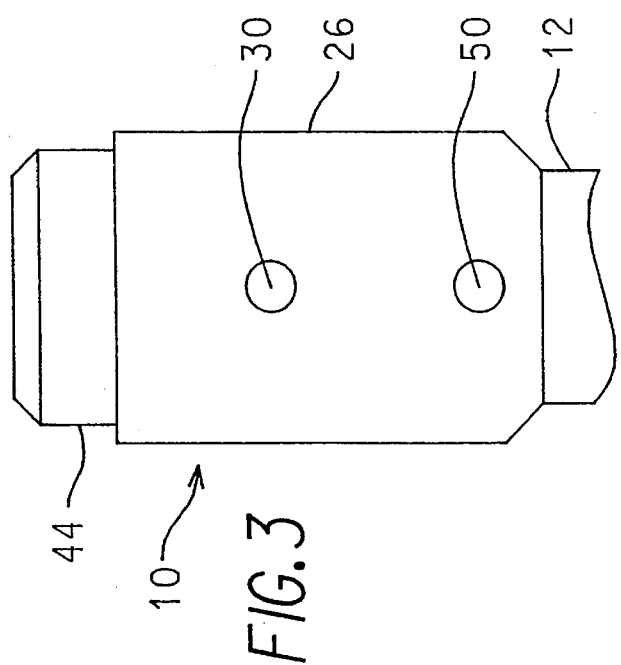
FIG. 3 is an underside view of the improved lubrication valve shown in FIG. 1.
Figure 4:
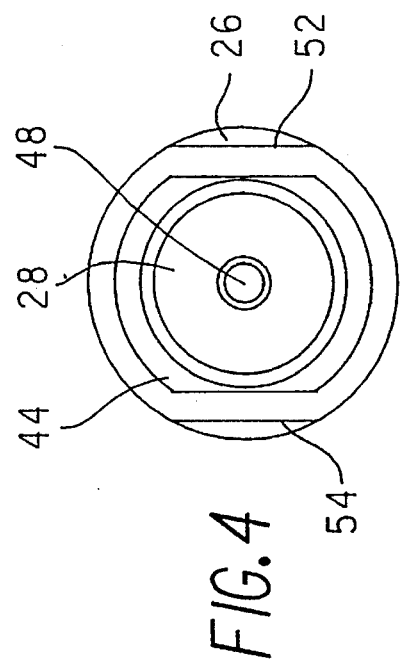
FIG. 4 is a front view of the improved lubrication valve shown in FIG. 1 without the end plug.

In order to achieve the foregoing objects, the present invention provides an improved lubricating valve for irrigation systems for attachment to a volume container containing a lubricant supply. The valve is configured to receive a pressure line connection from a turbine pump in an irrigation system and to automatically drip lubricant into the turbine pump when the pump is operating, indicated by the pressure in the pressure line reaching a predetermined level.

The valve comprises a hollow main body containing a central chamber and a hollow valve body containing a valve chamber. Located inside the central chamber is a piston assembly which contains a head and a shaft. The head is positioned inside the central chamber and the shaft extends through a connecting channel into the valve chamber. The valve chamber is configured to be in fluid communication with the lubricant supply when the valve is attached to the volume container. Located inside the valve chamber is a valve assembly comprising a ball and spring. The spring is biased so that the ball rests in the valve seat keeping the valve assembly in a default closed position.

The pressure line is connected to the valve and is in fluid communication with the central chamber. A lubrication line is connected from the valve to the pump and is in fluid communication with the connecting channel, valve chamber and lubricant supply.

When the pump is operating, pressure from the pump is supplied to the central chamber via the pressure line. When the pressure in the central chamber reaches a predetermined level, the piston is forced to reciprocate toward the valve assembly and the shaft forces the ball away from the valve seat allowing lubrication to flow from the lubrication supply through the valve chamber and connecting channel, into the lubrication line and into the pump. When the pump stops operation, the pressure built up in the central chamber is released to the atmosphere through a relief opening in the central chamber. As the pressure is released, the spring forces the ball back into engagement with the valve seat closing the valve and forcing the piston back into position in the central chamber.

In the preferred embodiment, a second piston head is attached to a cap which can be manually screwed into the end of the valve opposite the original piston. The second head abuts the first head forcing the shaft of the first piston into the ball, disengaging the ball from the valve seat and manually opening the valve to allow the lubricant to flow from the lubricant supply into the pump.

DESCRIPTION OF THE PREFERRED EMBODIMENT

Broadly stated, the present invention presents an improved lubrication valve for irrigation systems. The valve is attached to a volume container containing lubricant and is configured to regulate the flow of lubricant supplied to a turbine pump. The pump supplies a pressure line to the valve which in turn provides lubrication to the pump when the pressure in the line reaches a predetermined level which would indicate pump activity. The valve is also provided with a manual override for allowing extra manual lubrication.

Preferred embodiments of the improved lubricating valve for irrigation systems are described below.

Figure 2:
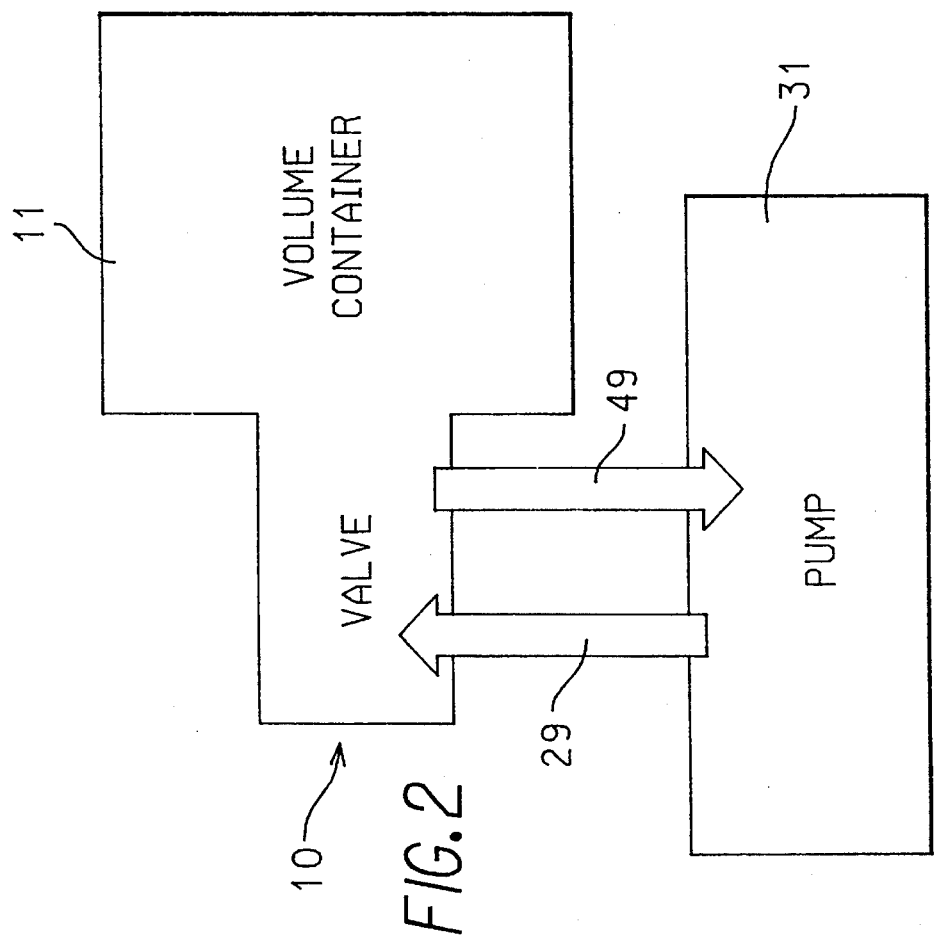
FIG. 2 is a block diagram of the improved lubrication valve, volume container and pump.
Figure 5:
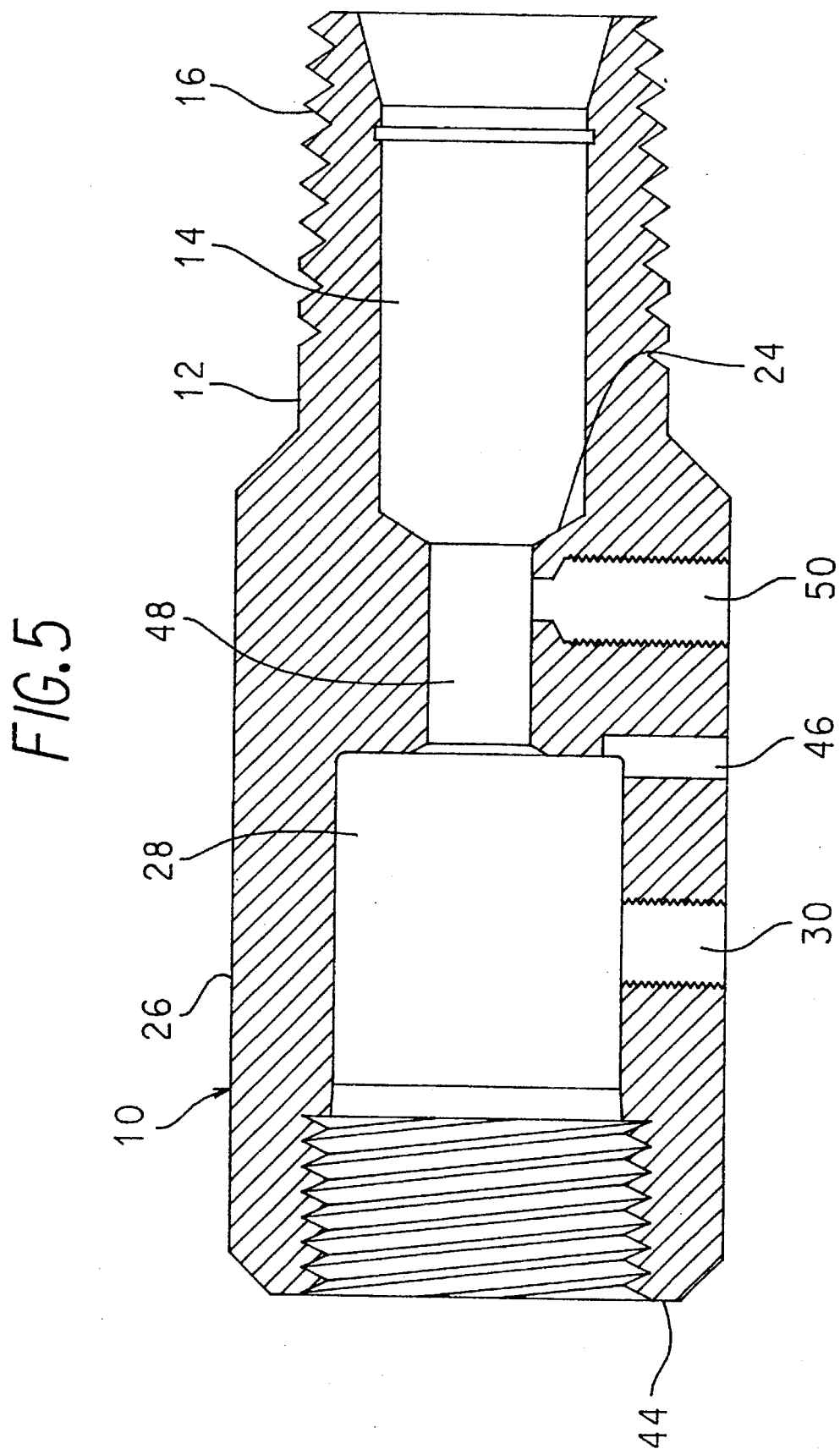
FIG. 5 is an enlarged side sectional view of the improved lubrication valve showing the arrangement and cooperation of the chambers, channel, line connections and relief opening.

Turning now to the drawings, and particularly FIGS. 1 and 2, the improved lubricating valve, indicated generally at 10, is configured to be attached to a volume container 11 containing lubricant. The valve 10 includes a hollow valve body 12 defining a valve chamber 14 and a threaded connection end 16 which is configured to be screwed into a threaded opening in the volume container 11 so that the valve chamber 14 is in fluid communication with the lubricant supply contained in the volume container 11. Located inside the valve chamber 14 is a valve assembly 18 comprising a ball 20 and a spring 22. The valve assembly 18 is configured so that the spring 22 is biased to urge the ball 20 toward a valve seat 24.

The valve's main body 26 is hollow and defines a central chamber 28. The main body 26 also contains a threaded pressure orifice 30 which is in fluid communication with the central chamber 28. A pressure line 29 is attached from a turbine pump 31 of an irrigation system into the central chamber 28 through the pressure orifice 30. A first piston assembly 32 having a head 34 and a shaft 36 is located inside the central chamber 28 and configured to reciprocate inside the central chamber 28. A second piston 38 having a head 40 is also located inside the central chamber 28 and is configured to be operably connected to a threaded end plug 42. The end plug 42 is configured to screw into a threaded plug end 44 of the main body 26. A pressure release orifice 46 located in the main body 26 is configured to be in fluid communication with the central chamber 28 and the atmosphere.

The main body 26 also defines a central channel 48 which is in fluid communication with the valve chamber 14. The shaft 36 of the first piston 32 extends through the central channel 48 and is configured to abut the ball 20 of the valve assembly 18. A threaded lubrication orifice 50, located in the main body 26, is placed in fluid communication with the valve chamber 14 via the central channel 48 for attaching a lubrication line 49 from the valve 10 into the turbine pump.

In operation, the valve 10 is installed in a threaded opening of a volume container 11 containing lubricant by screwing the connection end 16 into the container opening. The plug end 44 of the main body 26 of the valve 10 is configured with substantially straight sides 52, 54 to facilitate installation with a pipe wrench or other such tool. A lubrication line 49 which leads from the valve 10 into the turbine pump 31 is installed in the lubrication orifice 50 and a pressure line 29 which leads from the pump 31 to the valve 10 is installed in the pressure orifice 30.

The spring 22 is biased to urge the ball 20 into the valve seat 24 closing the valve assembly 18 and preventing lubricant from flowing from the volume container 11 into the turbine pump 31 via the lubrication line 49 when the pump 31 is idle. When the pump 31 is running, the pressure line 29 from the pump 31 causes the pressure in the central chamber 28 to rise. When the pressure in the central chamber 28 reaches a predetermined value, about 10 psi in the preferred embodiment, the first piston 32 is forced toward the valve assembly 18. As the piston 32 moves toward the valve assembly 18, the shaft 36 forces the ball 20 to disengage from the valve seat 24 allowing lubricant to flow from the volume container 11 through the valve chamber 14, central channel 48, lubrication orifice 50, and lubrication line 49 eventually reaching the turbine pump 31.

When the pump 31 is shut down, pressure in the central chamber 28 is dissipated through the pressure release orifice As the pressure dissipates, the spring 22 forces the ball 20 back into engagement with the valve seat 24 which forces the first piston 32 back into position in the central chamber 28. When the ball 20 engages the valve seat 24, a seal is again created which prevents lubricant from flowing from the volume container 11 into the turbine pump 31.

The first piston shaft 36 includes a connection end 56 and an arm end 58. The first piston head 34 is operably connected to the connection end 56 of the shaft 36 and the arm end 58 abuts the ball 20 of the valve assembly 18. Gasket grooves 60 and 62 are provided on the connection end 56 and arm end 58 respectively for holding O-ring gaskets 64 and 66. The O-ring gaskets 64 and 66 act to isolate the central chamber 28 from the valve chamber 14 to prevent pressure from seeping into the valve chamber 14 and to prevent lubricant from seeping into the central chamber 28.

The second piston 38 also includes a gasket groove 68 for holding an O-ring gasket 70 on the second piston 38. The second piston O-ring 70 prevents pressure from escaping from the central chamber 28 to the atmosphere through the plug end 44. The threaded end plug 42 is configured to screw into the threaded plug end 44 of the main body 26. A substantially bar-shaped plug handle 72 is provided on end plug 42 for screwing the end plug 42 into the plug end 44. Manual opening of the valve 10 is accomplished by screwing the end plug 42 into the plug end 44 of the main body 26 until the second piston head 40 abuts the first piston head 34 forcing the second piston shaft 36 to disengage the ball 20 from the valve seat 24. After the desired manual lubrication is accomplished, the end plug 42 can be loosened until second piston head 40 no longer abuts the first piston head 34 but still remains in the central chamber 28 allowing the spring 22 to force the ball 20 back into engagement with the valve seat 24.

It will be appreciated that the above-disclosed embodiment is well calculated to achieve the aforementioned objective of the present invention. In addition, it is evident that those skilled in the art, once given the benefit of the foregoing disclosure, may now make modifications of the specific embodiment described herein without departing from the spirit of the present invention. Such modifications are considered within the scope and spirit of the appended claims.

Various features of the present invention are set forth in the following claims.

What is claimed is:

1. A valve apparatus adapted to provide a predetermined amount of flow therethrough when open, the apparatus comprising:

a valve assembly biased to remain closed when pressure supplied from a pump is below a predetermined level;

means for opening said valve assembly to put said pump in fluid communication with a lubricant supply when said pressure meets or exceeds said predetermined level allowing lubricant to flow from said lubricant supply into said pump; and, means for manually opening said valve and holding open said valve assembly allowing lubricant to flow freely from said lubricant supply into said pump.

2. A valve apparatus according to claim 1 further comprising:

a hollow valve body defining a valve chamber having a valve seat, said valve chamber being in fluid communication with said lubricant supply; and said valve assembly comprising a ball and spring located in said valve chamber and configured so that said spring is biased to urge said ball into said valve seat closing said fluid communication between said lubricant supply and said pump when said pressure supplied from said pump is below said predetermined threshold.

3. A valve apparatus according to claim 1 further comprising:

a hollow main body defining a central chamber in fluid with communication with said pump wherein pressure supplied from said pump builds in said central chamber; and said means for opening said valve assembly comprises a first piston assembly positioned in said central chamber and abutting said valve assembly, said first piston assembly configured to reciprocate toward said valve assembly when said pressure supplied from said pump meets or exceeds the predetermined threshold forcing said valve assembly open and placing said pump in fluid communication with said lubricant supply allowing lubricant to flow from said lubricant supply into said pump.

4. A valve apparatus according to claim 2 further comprising:

a hollow main body defining a central chamber in fluid communication with said pump wherein pressure supplied from said pump builds in said central chamber; and said means for opening said valve assembly comprises a first piston assembly having a head and shaft, said head positioned in said central chamber and said shaft positioned to abut said ball, said first piston assembly configured to reciprocate toward said valve assembly when said pressure supplied from said pump meets or exceeds the predetermined threshold, said shaft forcing said ball out of engagement with said valve seat placing said pump in fluid communication with said lubricant supply and allowing lubricant to flow from said lubricant supply into the pump.

5. A valve apparatus according to claim 3 further comprising:

a pressure release orifice for releasing pressure built up in said central chamber into the atmosphere.

6. A valve apparatus according to claim 1 wherein said means for manually opening said valve comprises:

an end plug configured to be screwed into an end of the valve apparatus holding open the valve assembly when the plug is screwed in past a predetermined point and releasing said valve assembly to resume said biased closed position when said plug is screwed out past said predetermined point.

7. A valve according to claim 3 wherein said means for opening said valve comprises:

an end plug configured to be screwed into an end of the valve, said end plug comprising a second piston assembly having a head, said head of said second piston assembly being operably connected to said end plug and configured to abut said head of said first piston assembly wherein said second piston assembly forces said first piston assembly to hold open the valve assembly when the plug is screwed in past a predetermined point and allows said first piston assembly to release said valve assembly to resume said biased closed position when said plug is screwed out past said predetermined point.

8. A valve apparatus according to claim 1 wherein said lubricant supply comprises a volume container containing a supply of lubricant.

9. A valve apparatus for automatically controlling the lubrication of a pump having a pressure line which supplies pressure to the valve when the pump is running, the apparatus comprising:

means for connecting said valve to a lubricant supply;

means for connecting said valve to the pump;

a valve assembly biased to remain closed when the pressure supplied from the pump is below a predetermined level;

means for opening said valve assembly to put the pump in fluid communication with said lubricant supply when the pressure meets or exceeds said predetermined level allowing lubricant to flow from said lubricant supply; and, means for overriding the automatic operation of said valve and holding open said valve assembly allowing lubricant to flow freely from said lubricant supply into pump.

10. A valve apparatus according to claim 9 wherein said means for connecting said valve to the pump comprises a lubrication orifice configured to receive a lubrication hose connecting said valve to the pump.

11. A valve apparatus according to claim 9 wherein said means for connecting said valve to a lubricant supply comprises a threaded connection end configured to be screwed into a threaded opening in a volume container containing lubricant.

12. A valve apparatus according to claim 9 further comprising:

a hollow valve body defining a valve chamber having a valve seat, said valve chamber being in fluid communication with said lubricant supply and said means for connecting said valve to the pump; and said valve assembly comprising a ball and spring located in said valve chamber and configured so that said spring is biased to urge said ball into said valve seat closing said fluid communication between said lubricant supply and the pump when the pressure supplied from the pump is below said predetermined threshold.

13. A valve apparatus according to claim 9 further comprising:

a hollow main body defining a central chamber in fluid with communication with said pressure line wherein pressure supplied from said pressure line builds in said central chamber; and said means for opening said valve assembly comprises a first piston assembly positioned in said central chamber and abutting said valve assembly, said first piston assembly configured to reciprocate toward said valve assembly when the pressure supplied from the pump meets or exceeds the predetermined threshold forcing said valve assembly open and placing the pump in fluid communication with said lubricant supply allowing lubricant to flow from said lubricant supply into the pump.

14. A valve apparatus according to claim 12 further comprising:

a hollow main body defining a central chamber in fluid communication with said pressure line wherein pressure supplied from said pressure line builds in said central chamber; and said means for opening said valve assembly comprises a first piston assembly having a head and shaft, said head positioned in said central chamber and said shaft positioned to abut said ball, said first piston assembly configured to reciprocate toward said valve assembly when the pressure supplied from the pump meets or exceeds the predetermined threshold, said shaft forcing said ball out of engagement with said valve seat placing the pump in fluid communication with said lubricant supply and allowing lubricant to flow from said lubricant supply into the pump.

15. A valve apparatus for automatically controlling the lubrication of a pump, the apparatus comprising:

a hollow main body defining a central chamber having a plug end and a valve end;

means for connecting a pump pressure line from the pump to said apparatus to be in fluid communication with said central chamber wherein pressure supplied from said pressure line builds in said central chamber;

a hollow valve body defining a valve chamber, said valve body having a connecting end;

a central channel in fluid communication with said valve chamber and said lubricant supply;

a valve assembly comprising a ball and spring located in said valve chamber and configured so that said spring is biased to urge said ball into a position closing said fluid communication between said lubricant supply and said pump lubrication line when the pressure in said central chamber is below a predetermined level;

a first piston assembly having a head and a shaft;

said head positioned in said central chamber and configured to reciprocate toward said valve assembly when the pressure in said central chamber meets or exceeds said predetermined level; and a pressure release orifice for releasing pressure built up in said central chamber into the atmosphere;

said shaft being positioned in said central channel and configured to abut said valve assembly opening said valve assembly as said head reciprocates toward said valve assembly.

16. A valve apparatus according to claim 15 wherein the apparatus further comprises a positionable plug located at said plug end of said central chamber abutting said head of said first piston assembly, said plug being manually positionable to force and hold said first piston assembly in a position opening said valve assembly.

17. A valve apparatus according to claim 15 wherein said lubricant supply comprises a volume container containing a supply of lubricant.

\* \* \* \* \*